(12) United States Patent
Sathyanarayan

(10) Patent No.: US 6,691,106 B1
(45) Date of Patent: Feb. 10, 2004

(54) PROFILE DRIVEN INSTANT WEB PORTAL

(75) Inventor: Seshadri Sathyanarayan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/575,904

(22) Filed: May 23, 2000

(51) Int. Cl.$^7$ .............................. G06F 17/30; G06F 7/00; G06F 9/445
(52) U.S. Cl. ............................................ 707/3; 717/174
(58) Field of Search ............................... 707/3; 717/174

(56) References Cited

U.S. PATENT DOCUMENTS

| | | | |
|---|---|---|---|
| 5,983,221 A | * 11/1999 | Christy | .......................... 707/5 |
| 6,356,905 B1 | * 3/2002 | Gershman et al. | ............. 707/10 |
| 6,393,423 B1 | * 5/2002 | Goedken | ...................... 707/10 |
| 2001/0032092 A1 | * 10/2001 | Calver | ........................... 705/1 |

* cited by examiner

Primary Examiner—Wayne Amsbury
Assistant Examiner—Cindy Nguyen
(74) Attorney, Agent, or Firm—Pillsbury Winthrop LLP

(57) ABSTRACT

An instant portal software module executing on a computer system for locating relevant Web pages includes instructions to collect information regarding a user from the computer system. Instructions are provided to create a user profile based on the information collected. Instructions are also provided to receive a search entry from the user. The instant portal software module generates a plurality of queries based on the search entry and the user profile to search for relevant Web page addresses. The instant portal software module searches the Internet for relevant Web page addresses using the plurality of queries, and then provides the results of the relevant Web page addresses located to the user.

31 Claims, 2 Drawing Sheets

PROFILE DRIVEN INSTANT WEB PORTAL

BACKGROUND OF THE INVENTION

1. Field of the Invention

The present invention is directed to a system and method for building an instant Web portal related to topics of interest based on a user profile. An instant Web portal is a collection of all relevant links (addresses to Web pages) related to topics of interest. The instant Web portal serves to reduce the interaction costs that users incur in visiting multiple Web sites related to a topic, and searching or navigating different portal Web sites.

2. Discussion of the Related Art

Navigating the Web today is one of the most difficult tasks for a Web user. The sheer volume of information available makes it difficult for both the user and search engines to extract and collect relevant information. Navigation typically consists of the following steps: setting a goal, visiting known Web sites, determining which search engines to use, typing a search query by translating the user's thoughts to a language and grammar a search engine or Web page having a query prompt can understand, traversing the results, and refining the search. The quality of the results returned depends on the user's ability to correctly translate the search goal into search grammar appropriate for a search engine, and the search engine's performance. The chances of two people constructing the exact same query (i.e., the same set or sequence of words) to accomplish one goal are low. Also, the same person may construct the query differently on two separate attempts. In addition, having different grammar for different search engines aggravates the problem. Query construction, thus, is an important, difficult, and often repeated step in Web navigation and search.

Web portals act as good starting points for navigating the Internet, and particularly the World Wide Web (the Web). A Web portal in the context of the present invention is defined as a collection of relevant links to text, voice, video image or other data, etc. all on a single Web page. With a Web activity goal in mind, a user could step through the different directory or tool related links on a portal Web site and get closer to accomplishing a search goal. The alternative to this style of navigation is to visit individual Web sites related to a topic of interest looking for information on the topic. While portals offer a good single starting location for most topics, they suffer from at least the following limitations: (1) they usually do not provide a complete view of the Web (statistics show that information links provided on portal sites cover less than 50% of the complete Web); and (2) it is difficult to ascertain a complete picture of what a user is trying to accomplish by observing the clicking patterns on a Web site. Users tend to jump from the portal to a destination site. When that occurs, the portal Web site loses the user and has no way of detecting the user's current context (goal or activity).

Current search engines only categorize the information for which the user is searching. That is, the search engine may provide a general category for which related links may be stored. For example, if the user enters "Porsche Boxster" as the search entry, the search engine may produce Web sites related to Porsche Boxsters, as well as provide a category of "Automobiles", of which links to Web sites related to automobiles may be present, many of which may not be at all relevant to Porsche Boxsters. Therefore, the user must successively and manually refine a search entry or submit multiple queries to different search engines and Web sites until the user finds the desired information.

Internet browser add-ons, such as Alexa Internet, provide additional services to help locate Web sites related to the Web page that the user is currently browsing. Alexa Internet uses crawling, archiving, categorizing, and data-mining techniques to build "Related Links" lists for millions of Web Universal Resource Locator (URL) addresses. One technique used is to analyze the links on the crawled pages to find related Web sites. The day-to-day use of the Related Links list also helps build and refine the data. As the service is used, the requested URLs are logged. By looking at high-level trends, Alexa Internet can deduce relationships between Web sites. For example, if thousands of users go directly from site A to site B, then Alexa Internet may deduce that the two sites are likely to be related. Even though Alexa Internet is capable of ascertaining "trends" among a plurality of Web users between a variety of Web sites, Alexa Internet is still not "personalized" for any one particular user, and it utilizes no information about a particular user in making its deductions.

Another Internet browser add-on called Letizia, developed at the Massachusetts Institute of Technology, operates as a user interface in conjunction with an Internet browser. Letizia tracks the behavior of a Web user and attempts to anticipate items of interest by performing concurrent, autonomous exploration of Web page links from the user's current Web location (Web page). In other words, Letizia uses a technique of collecting and parsing information on neighborhood links—links that are in close proximity (one or 2 "clicks" away) from a Web page that the user is presenting browsing. However, Letizia only makes educated "guesses" as to what links from the current Web page the user might be interested, based on the user's current Web browsing behavior. But, Letizia does not search for other potentially relevant Web pages not linked to the browsed pages, nor does Letizia utilize any other personalized information about a particular user in making its Web page link recommendations.

DETAILED DESCRIPTION

Figure 1:
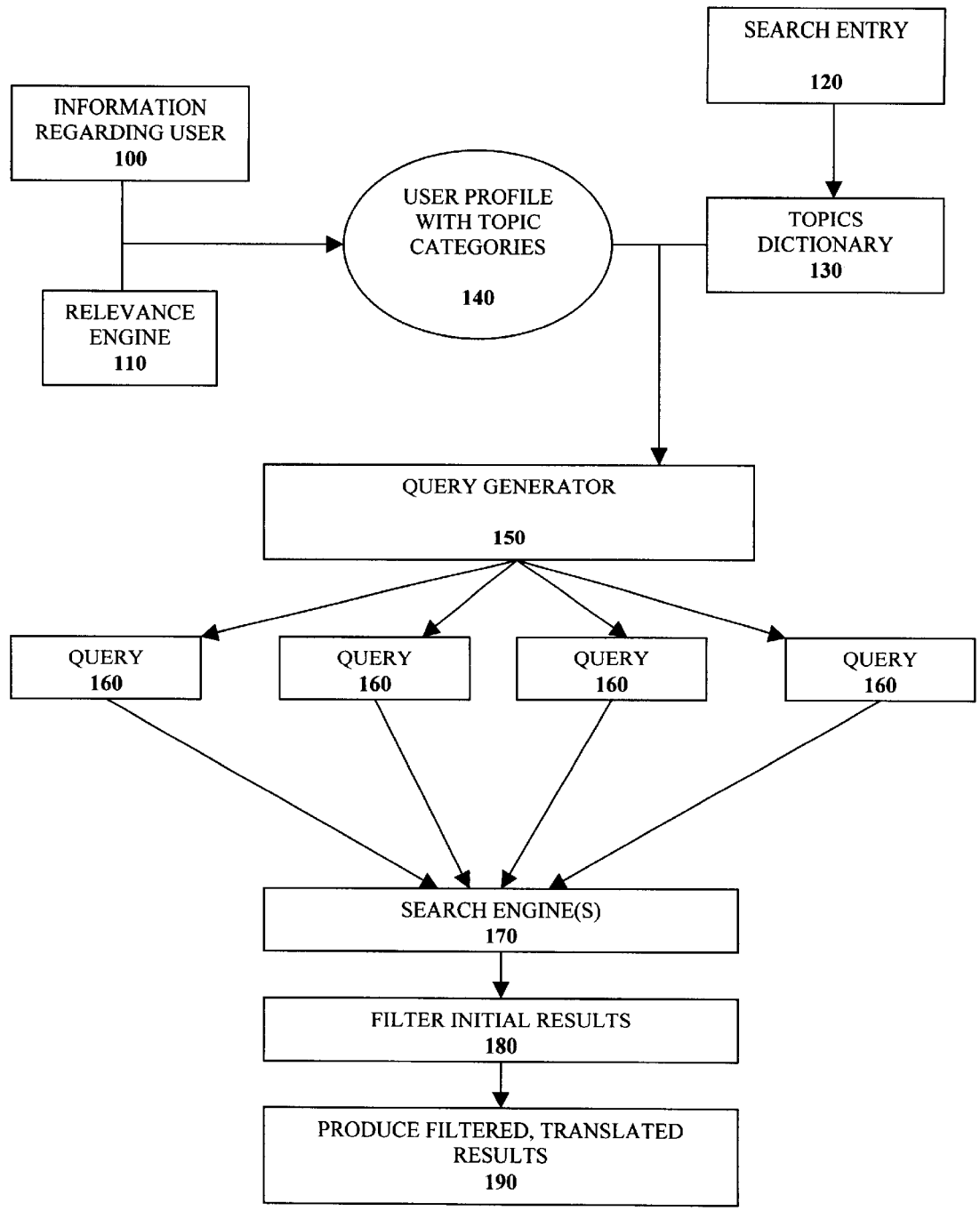
FIG. 1 illustrates an instant Web portal according to an embodiment of the present invention.

FIG. 1 illustrates an instant Web portal according to an embodiment of the present invention. A user profile 140 is maintained by a profile agent 200 (a software module, see FIG. 2) executing on the user's personal computer (PC) or other client device, and collects detailed information 100 about the user from different application sources on the client device. The information 100 collected about the user is then used to construct an initial and current user profile 140 that contains information about the user's interests, dislikes, current location, appointment status, current tasks, and any other information that may be stored on the user's PC or client device (which may be separately attached to the PC, such as a personal digital assistant (PDA) like a Palm Pilot computer). The profile agent 200 also looks at the user's bookmarks and cookies and visits the corresponding Web sites as these are sources of user interest. In one embodiment, the profile agent 200 could also capture the existing Web site preferences from the different Web sites that a user has visited (as indicated by cookies, bookmarks, or history holder). For example, the profile agent 200 could collect the news preferences off a Web site (e.g., the My Yahoo Web site settings) for the current user by logging into the Web site using the user's cookie on the client PC and extracting the relevant information from the news preferences Web page.

Additionally, the profile agent 200 has access to category profiles that consist of keywords that define the characteristics of a category. The user profile 140 also contains information on Web sites visited, user actions, and other details about a user's Web activities for a particular category (e.g., information that the user bought a Palm Pilot on a certain date for $455 may be recorded in the "Electronics" category within the user profile 140).

Web usage data mining consists of tracking and collecting a user's actions on a Web site. Some simple inferences are then drawn by analyzing the data. These conclusions are then combined with those drawn from all other users of the Web site to establish behavior patterns. Behavior patterns are then combined with Web site business rules (for selling, promotions, etc.) and applied to a number of services, such as providing recommendations, customer support, dynamic content creation, etc. The present invention includes a method of creating and maintaining a meaningful Web user profile designed for Web usage applications using relevance technology. The profile agent 200 is preferably a software module activated on a user's PC or other client device (such as a Palm Pilot, Web pad, pager, cellular or wireless application protocol (WAP) telephone, etc.). For the purposes of this discussion, the PC will be referred to as the standard client device; however, other client devices may be suitable for executing the profile agent and for extracting user information 100 therefrom.

Figure 2:
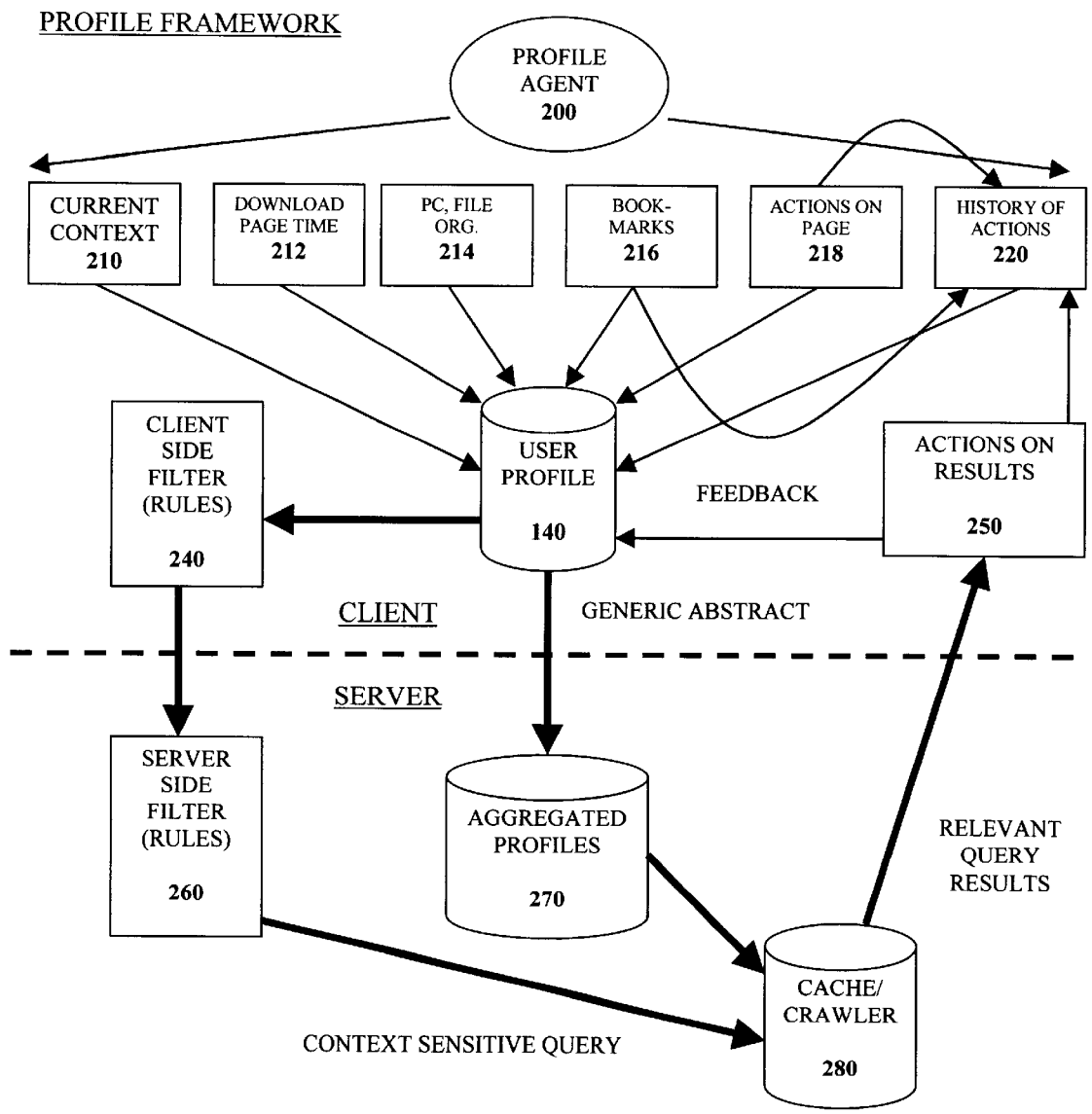
FIG. 2 illustrates a profile agent according to an embodiment of the present invention.

FIG. 2 illustrates a profile agent according to an embodiment of the present invention. The profile agent 200 collects user data 210, 212, 214, 216, 218, 220 from various applications and sources on the PC. The profile agent 200 first determines what applications are installed by looking at, for example, the "Program Files" directory or other suitable files on the PC and its organization 214. The profile agent 200 then queries any installed calendar applications, such as Microsoft Outlook, to capture any appointment details (meetings, events, etc.) for the user. The profile agent 200 may capture any bookmarked and cookie Universal Resource Locator (URL) Web addresses 216 from the Web browser application (such as Netscape Navigator or Microsoft Internet Explorer), or by simply scanning all of the files on the PC system. Cookies store information such as user name and password, and what parts of the site were visited; this information can be updated with each visit. The browser only shares each cookie with the server that originated it; other servers can only read their own cookies. Netscape Navigator, for example, can be set up to alert the user when a cookie is being sent so the user can accept it or not.

Other system details, such as the central processing unit (CPU), operating system, disk/storage (size, free space), and network details (such as download time 212) are also captured by querying the underlying infrastructure or, in the case of network connections, downloading a known file from the Web and determining the approximate network connection speed based on the size of the file and the time to download.

The profile agent 200 may also determine the current context 210 or goal of the user in constructing the user profile 140. For example, when the user is browsing automobile-related Web sites, the current context 210 would be set in the area of "automobiles". Additionally, information regarding actions 218 performed on a Web page, such as clicking to a particular hyperlink from that particular Web page, as well as the history of prior actions 220 taken by the user (which may also incorporate the information regarding a user's actions on a Web page 218), may be used in determining the user profile 140. The actions that the user takes on the returned results 250 may also be stored in the user profile 140. Any actions that the user takes with a bookmarked Web site 216 may also be recorded within the history of prior actions 220.

As shown in FIG. 2, information from the user profile 140 on the client PC may be transmitted to the client-side filter 240, which contains the rules and instructions for proper transmission of the information to the server computer. A server-side filter 260 receives the information. The server-side filter 260 contains the rules and instructions for proper transmission of the information to the cache/crawler 280, which is used to retrieve and review the information from the Web pages and to determine their relevance to the user's query. The user profile 140 may transmit a generic abstract to the server computer to form aggregated profiles 270 from different clients of the same user (forming a "meta-profile"), or from different clients of different users having similar goals and/or behaviors. The information in the aggregated profiles 270 may be transmitted to the cache/crawler 280 to similarly retrieve and review the information from Web pages and to determine their relevance to the user's query. The relevant query results may be transmitted to the user, and any action 250 taken by the user on the results (i.e., the user follows a hyperlink of a particular Web page) may be incorporated into the user profile 140. Furthermore, the actions taken by the user on the results 250 may be incorporated into the history of actions 220 as well. Also, the results could be translated to appropriate output format for delivery to any client device, such as a WAP phone, pager, Palm VII, Smart Phone, or Web pad.

Referring again to FIG. 1, the profile agent 200 may use a relevance engine 110, such as the Intel Evaluator Toolkit (ET) version 2.1 from Intel Corporation, to create keyword-based profile categories, or topic categories, within the user profile 140 to sort and categorize the information 100 obtained regarding the user. The Evaluator Toolkit 110 is a framework to create and store keyword-based profile categories and to match new data (such as Web pages, documents, etc.) with the profiles to detect relevance. The Evaluator Toolkit 100 components use variations on a number of research technologies, including, a vector classifier based on the Vector Space model, a "CN2 rule" induction algorithm developed by Peter Clark and Tim Niblett, 1989, and clustering algorithms known in the art.

The Evaluator Toolkit 110 also provides functions to parse Web pages for keywords. For example, the "Electronics" profile category may consist of keywords such as "video", "audio", "electronics", "television", "DVD", "player", "amplifier", "Sony", "Toshiba", "Yamaha", "phone", "cordless", etc. Other categories may include "Health", "Travel", "News", "Music", etc. For the "Music" category, there may be sub-categories such as "Rock", "Pop", etc. Additionally, keywords within a profile category may have the same "weight" or different weights depending on how frequently they occur in Web page documents within that category. This prioritization may then be used to determine a much closer (or farther) match for new documents to a category. Each profile category may consist of other attributes, such as information about the top Web sites visited, a measure of the user's interest level for the profile category, the user's Web usage within the profile category (such as described above, the purchase of a Palm Pilot for $455 on a certain date may be recorded within the "Electronics" profile category).

The user profile 140 is initially constructed by having the profile agent 200 visit the cookie and bookmarked Web sites stored on the user's PC. The profile agent 200 may use the relevance engine 110 (Evaluator Toolkit) to parse the cookie and bookmarked Web sites stored on the user's PC for keywords and collects the details about the Web pages (including its URL address, location name, title, top keywords from the Web page, links from the Web page). The keywords from the Web sites are matched against different profile categories created earlier to determine relevance (closeness of match) to each category. When a match is found, the user's interest level for the profile in incremented. The interest level may be a simple integer count or a more complex weighted value. For example, since bookmarked Web sites are an indication of more interest than cookies (the user puts in some effort to bookmark, while cookies do not require user input, except for confirmation), if a category match is with a bookmarked Web site, then the user interest level may be incremented by a higher count than when a cookie site matches.

With the information collected and processed as discussed above, the profile agent 200 may proceed to generate an initial interest profile for the user. During the user profile 140 collection or processing, user input is not required. The initial interest profile may include the following information: (1) the user's current location and appointment status (busy/not busy) from the user's calendar application (such as Microsoft Outlook); (2) top favorite sites (sites that have more bookmarks, or cookies, plus recent file access times, etc.); (3) least favorite sites (sites that have only one bookmark, for example, and whose old file access time indicates infrequent access); (4) top categories of interest (categories with high user interest count based on the processing described above); and (5) the user's Web comfort level (a measure determined from the type and number of Web applications installed and the length of time the application has been on the system, access times, etc.).

Once the user profile 140 is initially created, the profile agent 200 continues to update the information within the user profile 140. In certain situations, the more up-to-date and current information about the user is more helpful in obtaining the most relevant Web site matches. In another embodiment of the present invention, the profile agent 200 may capture user clicks while browsing Web pages, and extract the text of the hyperlink (among all the links from a page, the user selects one by visual analysis of the text associated with the links—hence the text is a strong source of information about the user's current goal or interest). By following the user and capturing the text of the links a user clicks on in going from page to page, the profile agent 200 could capture a large corpus of words that have some relevance to the user goal—as this is equivalent to the user typing words in a search engine to describe his/her goal. The profile agent 200 may also capture text that is typed into a search box on Web sites. As the user browses different Web pages, the Web pages may be parsed using the relevance engine 110 for keywords, and matched against category profiles. The use of the relevance engine 110 helps establish a relative importance for one category over another. Other user actions that are good sources of user interest/disinterest in a category include: (1) time spent on a Web page; (2) the number of times a link thread is taken; (3) the act of purchasing an item on the Web; (4) attributes selected on a form that the user fills out on a Web site (for example, the color red for an automobile that the user selected could be captured and stored).

With information collected and processed in the manner described above, the current user profile 140 is generated to produce the following information: (1) current interest category (based on pages visited, user clicks, text typed, etc.); (2) current user location, appointment status; and (3) the user's current goal (through detection of user interest, current category of browsing).

The initial and current user profile 140 may be further enriched with demographics information provided by the user through a form or other method. The user's demographics information may include the user's home address, age, sex, Web expertise, time on the Web, aspects relating to financial status, job, house, automobile, family, etc. In further embodiments, client profiles from the different clients (PC's, laptops, Palm Pilots, WAP mobile phones, etc.) could be combined to generate a meta-profile for the user. These client profiles could further include characteristics of the computing infrastructure available to the user at any time—power, connectivity, display, storage, processing power, etc. This meta-profile may then be tied to a range of services for managing Web content and commerce services. These could include constructing an instant portal related to a topic of interested indicated by the user, finding related sites for the information that a user is currently viewing on a Web page, having a software module proactively query specific Web sites (such as news sites, product sites, auction sites, etc.) for the current item of interest and construct a very specific report.

The user searching for an interested topic first provides a search entry 120 for the instant Web portal. The search entry 120 may be a single keyword, or a keyword phrase, of the subject matter in which the user is interested. Once the search entry 120 is entered into the instant Web portal, the search entry 120 is transmitted to the topics dictionary 130. The instant Web portal has access to the topics dictionary 130 so as to provide an association of the search entry 120 to a topic category within the user profile 140.

The instant Web portal uses the information regarding the user 100, stored and categorized within the user profile 140, and the search entry 120, made by the user, to create a plurality of search queries 160 by using a query generator 150. The keyword(s) entered as the search entry 120 are matched against the topics dictionary 130 to determine the category (or categories) of interest to which the search entry 120 may relate within the topic categories within the user profile 140. For each topic category that matches the search entry 120, as determined by the topics dictionary 130, the information associated with each topic category is sent to the query generator 150 to construct specific queries to search engines 170 for locating relevant Web sites. The information may also determine which Web sites and search engines are to be utilized for performing the search.

Because a Web query 160 typically consists of a collection of disjoint words or a sentence, the query generator 150 is preferably adapted to build query grammar that relies on each particular search engine's ability to interpret individual words as well as groups of words (such as a sentence). The query generator 150 is preferably adapted to construct appropriate customized queries 160 based on the particular search entry 120 made by the user. The query generator 150, for example, may be adapted to generate valid search queries 160 using the Webcrawler search engine. The Webcrawler search engine performs semantic interpretation of individual words as well as groups of words to perform the search.

However, any suitable search engine (such as Yahoo!, Altavista, Excite, etc.) may be utilized to receive search queries 160 formatted for each particular search engine to perform the search.

Utilizing the available information (such as that in the user profile 140) to assist the query generator 150 in constructing the queries 160 will be at least as useful as the search entry 120 itself to construct the queries 160. The results obtained from the search engines 170 may be further filtered using the information within the user profile 140 to ensure relevance to the search entry 120. The results could also be translated to different formats for appropriate output to specific devices. Finally, the filtered results (the Web site address URL links) may be reported 190, and the results may be categorized by data type, location, source, and even by category.

The search could either be reactive or proactive based on whether it is explicitly requested for by the user, or a software agent performs the search without an explicit request (as in the case of a shopping agent that uses the profile information and interest regarding an item and searches specific Web sites to gather and report auctions, news, accessories, and recommendations). Profile-driven personalization may be of three forms: enterprise driven, where the profile data is largely collected from the user's corporate network, PC, and connection characteristics; data driven, such as where a user's click-stream when visiting a Web site is analyzed and business rules are used to target the user with promotions, etc.; and end-user driven, where the user has complete control over what profile information is collected, how it is collected (implicitly or explicitly), and how it is used (for promotions, or user utility, etc.). An embodiment of the present invention is directed to end-user profile driven personalization.

For example, the user may type in "Porsche Boxster" as the search entry 120. The search entry 120 will be transmitted to the topics dictionary 130, where the words "Porsche" and "Boxster" are matched to relevant topic categories within the user profile 140, such as "Automobile", "Sports Car", or any other relevant topic category that may have been generated by the relevance engine 110 based on the information regarding the user 100. The information sorted and categorized within the user profile 140 used by the query generator 150 to construct the queries 160 may include details such as: (1) where the user lives (so as to determine the closest Porsche dealership and provide the dealer's Web home page); (2) the user's income level (so as to determined any financial services the user may use for the purchase of an automobile); and (3) other automobile(s) the user may own (so as to determine, for example, a user's color preferences, or other preferred options for automobiles).

Once all the available information is collected, the query generator 150 constructs a plurality of queries 160 based on the relevant information, and the queries are properly formatted for each Web site for which the query 160 is intended, and in particular, search engines 170. An example of such a report that may be generated is as follows in Example 1:

Example 1: Porsche Boxster

| | |
|---|---|
| Porsche Web Deals | Porsche Web site |
| CarPoint - Porsche | |
| AutoByTel - 2000 Porsche | |

Example 1: Porsche Boxster -continued

| | |
|---|---|
| Classifieds Ads in Local Area | Latest Updates from Related Book-Marked Sites |
| Classifieds.com Porsche Ad Roger | |
| Classifieds.com Porsches for Sale | Porsche Gets a New Engine |
| | Porsche Club Members Meet 3/18 |
| Porsche Clubs and Events | Local Dealers |
| Red Porsches on Display | Sunset Audi & Porsche |
| Porsche Club | |
| Porsche Videos | Consumer Reports Details on Porsche |
| Porsche Movie File | Porsche Boxster Specifications Review |
| | Spare Parts Expensive |
| | Local Links of Interest |
| | Ride Porsche Day |

The instant Web portal uses as much of the information in the user profile 140 as possible in constructing the queries 160 and filtering 180 the content that is returned.

Additionally, the instant Web portal may be designed so that instead of manually typing in a search entry 120 in a text box, for example, the user can highlight a word or phrase/topic on the Web page that the user is browsing so that the highlighted word or phrase/topic becomes the search entry 120 for conducting a search for relevant Web pages. Furthermore, the instant Web portal may utilize information about the user's current context, such as the user's activity history in the immediate past, the user's current goals (search goals), as well as the current Web page. This additional information may help provide for additional keywords that may assist the query generator 150 in constructing additional queries 160, or further refine the search. For example, if the user had already visited a Web page in the last few minutes and there are no updates, that page will not be included on the results page and will be filtered out.

Other features of the instant Web portal may include, for example, if the user issued a search entry 120 from a Palm Pilot connected over a 9.6 kbps wireless link to the Internet, the video and image links will not be displayed, given the limited bandwidth known to the instant Web portal, and instead may be substituted with more text links. Furthermore, if the Palm Pilot's physical location is known (such as through a Global Positioning Satellite (GPS) system connection), the position information may be used to construct queries to determine the location of Porsche dealerships, as in the example above, closest to the current location of the user.

The instant Web portal may be designed so that the user can at any time return to the instant Web portal page through a single click to an "Instant Portal" trigger, for example, on the software interface. The instant portal agent is the software module that implements the instant portal feature.

Another embodiment of the present invention may include the combination of profiles constructed by different client devices (computers, PDA's, etc.) owned by the user to generate an even more integrated usage profile (the "meta-profile") to improve the performance of the instant Web portal.

Using the instant Web portal, the information presented is personalized to the user's current profile 140 and the context of the user's browsing activities, thus resulting in more relevant information than what can be gleaned from a portal site on the topic. Additionally, all relevant links are available on a single page, thus serving to reduce the interaction costs incurred when the user visits each individual site to extract the same information.

The work performed by the instant Web portal is driven by the profile constructed and maintained by the separate profile agent 200 (the software module maintaining the user profile 140). The user profile 140 provides enough detail about the user's current context (goals, physical resources, activity, history), that it significantly alters the querying and filtering abilities of the portal constructor and results in more relevant information. Without the information, the results returned would be similar to if not the same as, those returned by search engines that perform simple categorization.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An instant portal software module executing on a computer system, the software module comprising instructions:

to determine a plurality of distinct applications installed on the computer system;

to automatically collect, without input from a user, information regarding the user from the plurality of distinct application programs installed on the computer system;

to create a user profile based on the information collected;

to generate a plurality of key-word based profile categories in the user profile using a relevance engine;

to receive a search entry from the user to search for data related to the search entry on the Internet;

to generate a plurality of queries based on the search entry and the plurality of key-word based profile categories to search for relevant Web page addresses on an Internet;

to search the Internet for relevant Web page addresses using the plurality of queries generated; and to produce results of the relevant Web page addresses located.

2. The instant portal software module according to claim 1, wherein the relevance engine parses a web page to generate a keyword the keyword, representing a topic of the web page, and wherein the instant portal software module further includes instructions to filter the results of the Web page addresses located according to the keyword generated.

3. The instant portal software module according to claim 1, wherein the information regarding the user includes at least one of: prior Web pages visited by the user, user activities, user appointments, programs stored on the computer system, demographic information about the user, physical resources of the computer system, and bookmark and cookie Web site information.

4. The instant portal software module according to claim 1, wherein the user profile is arranged so as to match the information regarding the user in the user profile with topic categories in the user profile.

5. The instant portal software module according to claim 1, wherein the plurality of queries are generated by using the search entry to determine a category of interest selected from a topics dictionary, and the plurality of queries are generated using the information regarding the user in the user profile that is relevant to the category of interest.

6. The instant portal software module according to claim 1, wherein the results of the relevant Web page addresses located are displayed on a page for viewing.

7. The instant portal software module according to claim 1, wherein the results of the relevant Web page addresses located are sorted by at least a data type, a location source, and a category.

8. The instant portal software module according to claim 1, wherein the results of the relevant Web page addresses are transmitted to formats appropriate for display on respective client devices.

9. The instant portal software module according to claim 4, wherein the topic categories are prioritized by levels of interest of the user.

10. The instant portal software module according to claim 1, wherein the plurality of queries are adapted for obtaining search results on a search engine.

11. A method of obtaining interested Web pages on an Internet, the method comprising:

determining a plurality of distinct applications installed on a computer system;

automatically collecting information regarding a user, without input from the user, from the plurality of distinct application programs installed on the computer system and associated data sources;

creating a user profile based on the information collected;

generating a plurality of key-word based profile categories in the user profile using a relevance engine;

receiving a search entry from the user to search for data related to the search entry on the Internet;

generating a plurality of queries based on the search entry and the plurality of key-word based profile categories to search for interested Web page addresses on the Internet;

searching the Internet for interested Web page addresses using the plurality of queries generated; and producing results of the interested Web page addresses located.

12. The method according to claim 11, further including:

parsing a web page by the relevance engine to generate a keyword, the keyword representing a topic of the web page; and filtering the results of the interested Web page addresses located using the user profile and the keyword generated.

13. The method according to claim 11, wherein the information regarding the user includes at least one of: prior Web pages visited by the user, user activities, user appointments, programs stored on the computer system, demographic information about the user, and physical resources of the computer system.

14. The method according to claim 11, wherein the user profile is arranged so as to match the information regarding the user in the user profile with topic categories in the user profile.

15. The method according to claim 14, wherein the topic categories are prioritized by levels of interest of the user.

16. The method according to claim 11, wherein the plurality of queries are generated by using the search entry to determine a category of interest selected from a topics dictionary, and the plurality of queries are generated using the information regarding the user in the user profile that is relevant to the category of interest.

17. The method according to claim 11, wherein the results of the interested Web page addresses located are translated as needed and displayed on a page for viewing.

18. The method according to claim 11, wherein the results of the interested Web page addresses located are sorted by at least a data type, a location source, and a category.

19. The method according to claim 11, wherein the plurality of queries are adapted for obtaining search results on a search engine.

20. A computer system for obtaining interested Web pages on an Internet, comprising:

a user profile including information regarding a user, wherein the information regarding the user is associated with relevant topic categories within the user profile, and the information regarding the user is automatically collected by the computer system, without input from the user, from a plurality of distinct application programs installed on the computer system; and a software program executing on the computer system, the program having instructions, to determine a plurality of distinct applications installed on the computer system, to automatically collect, without input from a user, information regarding the user from the plurality of distinct application programs installed on the computer system, to create a user profile based on the information collected, to generate a plurality of topic categories in the user profile using a relevance engine, to receive a search entry from the user to search for data related to the search entry on the Internet, to generate a plurality of queries based on the search entry and the Plurality of topic categories to search for interested Web page addresses on the Internet, to search the Internet for interested Web page addresses using the plurality of queries generated, and to produce results of the interested Web page addresses located.

21. The computer system according to claim 20, wherein the relevance engine parses a web sage to generate a keyword, the keyword representing a topic of the web page, and wherein the software program further includes instructions to filter the results of the interested Web page addresses located using the user profile and the keyword generated.

22. The computer system according to claim 20, wherein the information regarding the user includes at least one of: prior Web pages visited by the user, user activities, user appointments, programs stored on the computer system, demographic information about the user, physical resources of the computer system, and bookmark and cookie Web site information.

23. The computer system according to claim 20, wherein the plurality of queries are generated by using the search entry to determine a category of interest selected from a topics dictionary, and the plurality of queries are generated using the information regarding the user in the user profile that is relevant to the category of interest.

24. The computer system according to claim 20, wherein the results of the interested Web page addresses located are displayed on a page for viewing.

25. The computer system according to claim 20, wherein the results of the interested Web page addresses located are sorted by at least a data type, a location source, and a category.

26. The computer system according to claim 20, wherein the topic categories are prioritized by levels of interest of the user.

27. The computer system according to claim 20, wherein the plurality of queries are adapted for obtaining search results on a search engine.

28. A search system for obtaining interested Web pages on an Internet, comprising:

a user profile including information regarding a user, wherein the information regarding the user is associated with relevant topic categories within the user profile, and the information regarding the user is automatically collected by a computer system, without input from the user, from a plurality of distinct application programs installed on the computer system;

a software program executing on the computer system, the program having instructions, to determine a plurality of distinct applications installed on the computer system, to automatically collect, without input from a user, information regarding the user from the plurality of distinct application programs installed on the computer system, to create a user Profile based on the information collected, to generate a plurality of topic categories in the user profile using a relevance engine, to parse a web page using the relevance engine to generate a keyword representing a topic of the web page, to receive a search entry from the user to search for data related to the search entry on the Internet, a query generator to generate a plurality of queries based on a search entry from the user and the plurality of topic categories to search for data related to the search entry on the Internet; and at least one search engine to search the Internet for interested Web page addresses using the plurality of queries generated based on the search entry and the user profile.

29. The search system according to claim 28, wherein the information regarding the user includes at least one of: prior Web pages visited by the user, user activities, user appointments, programs stored on the computer system, demographic information about the user, and physical resources of the computer system.

30. The search system according to claim 28, wherein the plurality of queries are generated by using the search entry to determine a category of interest selected from a topics dictionary, and the plurality of queries are generated using the information regarding the user in the user profile that is relevant to the category of interest.

31. The search system according to claim 28, wherein the topic categories are prioritized by levels of interest of the user.

\* \* \* \* \*